March 31, 1925.
A. P. ASPIN
1,531,896
RESILIENT WHEEL
Filed Sept. 8, 1923
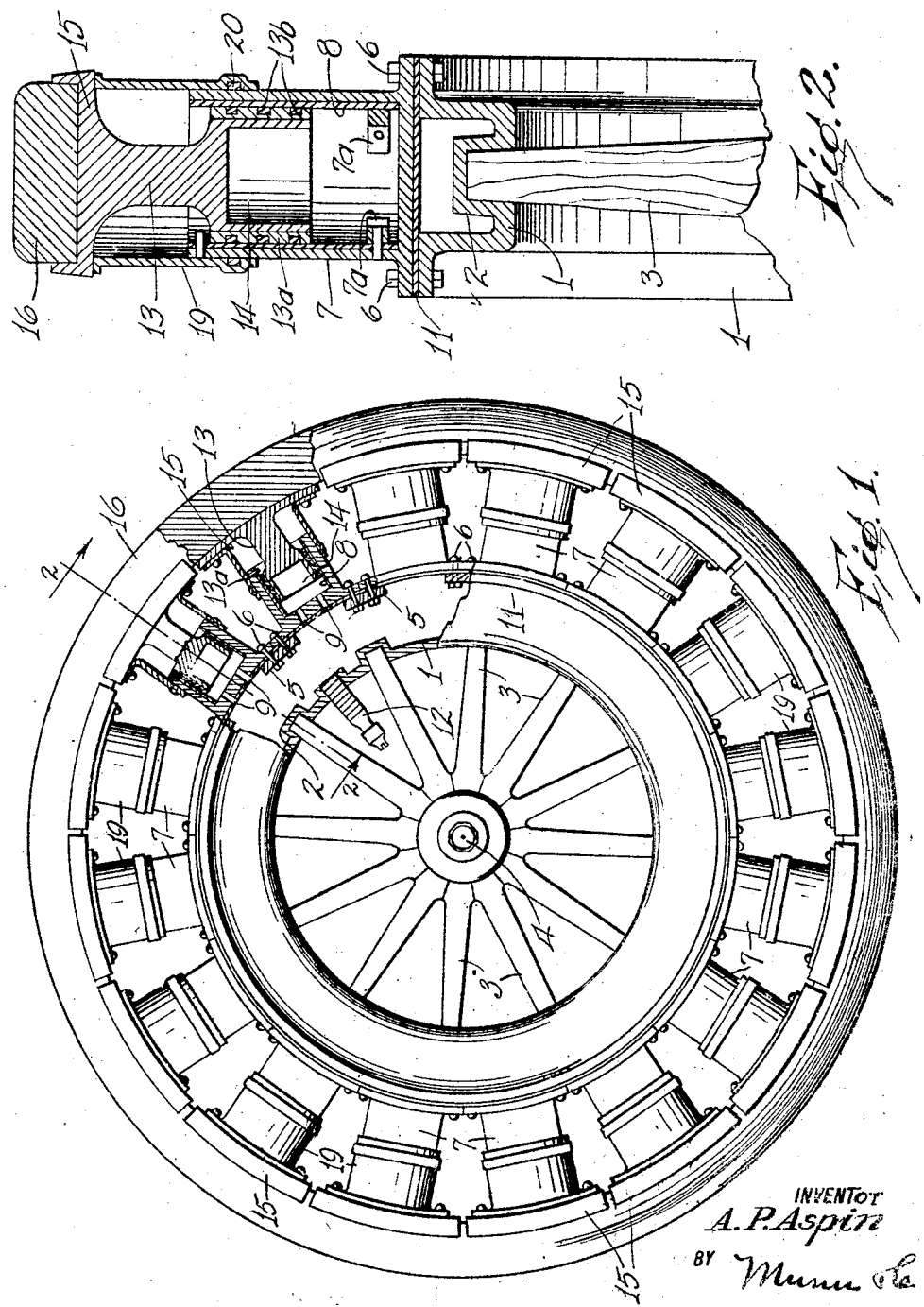
INVENTOR
A. P. Aspin
BY Munn &c
ATTORNEYS Patented Mar. 31, 1925.

1,531,896

UNITED STATES PATENT OFFICE.

ALFRED P. ASPIN, OF CHICAGO, ILLINOIS.

RESILIENT WHEEL.

Application filed September 8, 1923. Serial No. 661,643.

*To all whom it may concern:*

Be it known that I, ALFRED P. ASPIN, a citizen of the United States, and a resident of Chicago, in the county of Cook and State of Illinois, have invented a new and useful Improvement in a Resilient Wheel, of which the following is a full, clear, and exact description.

My invention relates to improvements in resilient wheels, and more particularly that type of wheel employing a resilient tire, and it consists in the combinations, constructions, and arrangements herein described and claimed.

An object of my invention is to provide a resilient wheel of the character described having a single resilient tread possessing the resiliency of a pneumatic tire, yet which is entirely puncture-proof.

A further object of my invention is to provide a resilient wheel of the character described in which the felly is possessed of particularly novel structure in its union with the spokes of the wheel to provide a rigid and durable structure.

A further object of my invention is to provide a resilient wheel of the character described in which a plurality of pneumatic pistons and cylinders are employed and in which air is admitted to the cylinders from a common pressure chamber. This greatly facilitates the adjustment of pressure upon the tire.

A further object of my invention is to provide a resilient wheel of the character described in which the road shock is evenly distributed to all parts of the wheel adjacent the tread, as in the case of a pneumatic casing of the ordinary type.

A further object of my invention is to provide a device of the character described which is simple in construction and which is thoroughly practical for the purpose intended.

Other objects and advantages will appear in the following specification, and the novel features of the invention will be particularly pointed out in the appended claims.

My invention is illustrated in the accompanying drawings, forming part of this application, in which—

Figure 1 is a side elevation of an embodiment of my invention, a part thereof shown in section, and Figure 2 is a sectional view along the line 2—2 of Figure 1.

In carrying out my invention, I make use of a vehicle wheel consisting of a metal felly 1 annular in shape and substantially U-shaped in cross section (see Figure 2). The inner wall of the felly 1 is provided with a plurality of spaced apart depressions 2 for receiving the outer ends of spokes 3 extending radially from a hub 4. This structure, as shown in Figure 1, is a particularly rigid structure, and the chances of the spokes 3 becoming loose from the felly 1 are slight.

A plurality of spaced apart bridge members 5, integral with the felly 1, are disposed across the peripheral edges of the felly. The purpose of these bridges 5 is to receive bolts 6 by means of which cylinders 7 are securely fixed to the outer wall of the felly 1. The cylinders 7 have their inner walls finished and are provided with a bronze bushing 8 closely contacting the side walls thereof. Each of the cylinders 7 is provided with a pair of vent openings or ports 9 in the lower wall communicating with the interior of the space between the adjacent walls of the felly 1. A rubber gasket 11 is clamped between the cylinders 7 and the outer peripheral walls of the felly so as to render the space between the adjacent side walls of the felly and the cylinders air-tight. This structure virtually forms an air chamber.

A valve 12 of the ordinary type, such as employed on the pneumatic tube in use with pneumatic casings, is projected through the inner wall of the felly 1 so that air may be admitted to the air chamber under pressure.

Each of the cylinders 7 is provided with a piston 13 having a cavity 14 in its end wall, as shown in Figure 1. Each of the pistons 13 has a steel casing $13^a$ fixed on the outer peripheral walls thereof in which three piston rings $13^b$ are fitted. These pistons 13 are arranged to closely fit the inner walls of the bushings 8 so as to compress air in the cylinders when the pistons 13 are forced toward the hub 4.

Each of the pistons 13 has the segmental part of a tire carrying rim 15 formed at its outer end. These tire carrying segments are spaced at sufficient distance from one another to permit the inward movement of the pistons 13 toward the hub for the full stroke of the cylinders 7.

A solid rubber vehicle tire 16 is carried on the several segmental rim sections 15. This tire 16 is pressed outwardly and at a uniform pressure on all sides of the hub 4, save that portion of the tire which is resting upon the ground and directly beneath the hub. This section of course is forced toward the hub 4 to a slight degree, depending upon the pressure of the air within the pistons and the air chamber of which the felly 1 is a part.

In order that dust may be entirely precluded from the interior of the cylinders 7 and from accumulating on the side walls of the bushings 8 and the cylinders 7, dust-tight metal covers are provided. The covers consist of cylinders 19 carried by the pistons 13 adjacent their outer ends and arranged to encompass the outer side walls of the cylinders 7. Each of the cylinders 19 are provided with packing rings 20 which contact with the outer side walls of the cylinders 7. Each of the cylinders 7 is provided with inwardly extending stop members 7ª at its innermost end to positively prevent the inward movement of the piston 13 beyond a predetermined stroke.

From the foregoing description of the various parts of the device, the operation thereof may be readily understood. In use, my improved vehicle wheel provides much the same advantages and benefits as are derived from the ordinary type of pneumatic casing and pneumatic tube, which advantages consist chiefly in the absorption of vibration due to road shock upon the wheels, and in the general resiliency of the entire wheel, which provides comfortable riding qualities for the vehicle on which the wheels are employed.

My improved wheel is provided with a supply of air under pressure admitted through the valve 12 to the air chamber within the felly 1 into the cylinder 7. The pressure of this air is dependent entirely upon the load which is carried by the vehicle and upon the strength and resistance of the tire 16. In use, the tire 16 when contacting with the road is pressed inwardly, due to the weight of that portion of the vehicle distributed above the tire, and the adjacent piston 13 is forced toward the hub 4 in its associate cylinder. This movement will cause a compression of air within the cylinder 7 which momentary compression is distributed through the openings 9 to the air chamber within the felly 1 and ultimately to the remaining cylinders. As the wheel continues to rotate, this operation is repeated. An extra heavy road shock is just as easily distributed over the remaining portions of the wheel as with a slight road shock. The dust covers effectually prevent the entrance of dust, sand, or the like, to the cylinders 7 and therefore prolong the efficient operation of the wheel.

I claim:

1. A resilient wheel of the character described comprising an annular felly substantially U-shaped in cross section, said felly being formed with a plurality of depressions in its innermost wall for receiving the ends of spokes for said wheel, a plurality of cylinders arranged on the outermost peripheral edge of said felly so as to virtually form an air chamber between the adjacent inner walls of the felly and said cylinders, each of said cylinders being provided with ports communicating with said air chamber, pistons disposed within said cylinders, each of said pistons being formed with the segmental part of a tire carrying rim on its outermost end, and a flexible endless tire carried by said segmental tire carrying rim, whereby said tire is substantially concentric with said felly.

2. A resilient wheel of the character described comprising an annular felly substantially U-shaped in cross section, a plurality of cylinders arranged on the outermost peripheral edge of said felly thereby forming an air-tight chamber between the adjacent inner walls of the felly and said cylinders, each of said cylinders being provided with ports communicating with said air chamber, pistons disposed within said cylinders, stop members for limiting the inward movement of said pistons, a segmental part of a tire carrying rim carried by said pistons on the outermost ends, and a flexible endless tire carried by said segmental tire carrying rim, whereby said tire is substantially concentric with said felly.

ALFRED P. ASPIN.